A. THOMA.
PROCESS OR METHOD OF FILLING THE BOTTOM CAVITIES OF SHOES.
APPLICATION FILED MAR. 30, 1912.
1,036,931. Patented Aug. 27, 1912.
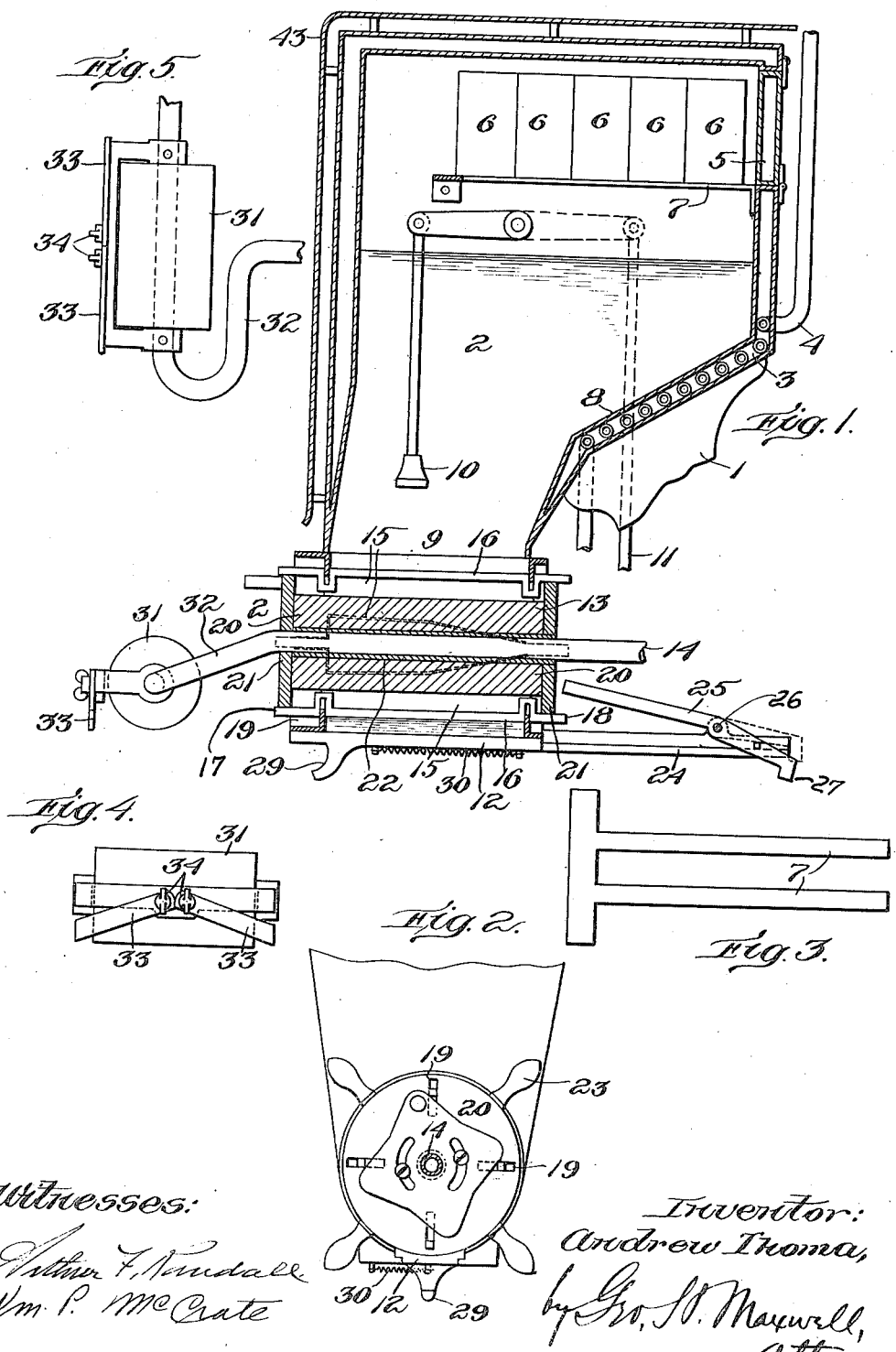

UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

PROCESS OR METHOD OF FILLING THE BOTTOM CAVITIES OF SHOES.

1,036,931.     Specification of Letters Patent.     Patented Aug. 27, 1912.

Original application filed April 28, 1906, Serial No. 314,127. Divided and this application filed March 30, 1912. Serial No. 687,385.

*To all whom it may concern:*

Be it known that I, ANDREW THOMA, a citizen of the United States, and resident of Cambridge, in the county of Middlesex of Massachusetts, have invented an Improvement in Processes or Methods of Filling the Bottom Cavities of Shoes, of which the following description, in connection with the accompanying drawings, is a specification, like letters on the drawings representing like parts.

This is a division of my application Serial No. 314,127, filed April 28, 1906.

In handling cementitious compositions of the kind known as fillers for shoe-bottoms, such as contained in my Patents Nos. 832,002, 855,868, 861,555, the process which has almost invariably been followed has been that set forth in my Patent No. 808,224, of December 26, 1905, requiring the operator to dip up or otherwise place in the cavity a selected amount in the form of a heap, and then spread this roughly around in the cavity by a spatula or knife to approximately the shape and thickness desired, and then finish the operation by rolling it down. This requires skill and time.

Accordingly, my present process is an improvement in that I form the required preliminary determined amount of the plastic filler into approximately the shape and thickness corresponding to the cavity to be filled, and then I place this died or shaped and formed layer, sheet or leaf of the plastic composition approximately in place in the cavity and subject to a leveling pressure which is preferably hot for facilitating the spreading and sticking of the filler piece or layer. By reason of my present improvement, practically all the necessity of skill is eliminated, and the speed with which the work can be done is greatly increased. While I prefer carrying out the process in the presence of heat, I do not intend to restrict the invention thereto.

To carry out the present process, the filler must be plastic, *i. e.* moldable when in the sheeted and shaped form. In the next place, it must so remain until after the leveling pressure has been applied thereto, in order that the filler may be brought to the exact level or thinness and the exact expansion required to fill the cavity properly and to conform to the limits of the cavity. For instance, the toe portion of the usual shoe cavity is deeper than the ball portion, and in fact some manufacturers bring the ball portion of the innersole practically to the same level as the outersole, so that at the center of the ball there is very little or no depth whatever to the cavity, although there is some depth next to the inseams even at the ball portion of the shoe-bottom. Hence, for these various reasons the filler, according to my present process, must be plastic and remain so for an appreciable length of time. Preferably the leveling is effected immediately after dumping or placing the died or shaped layer in the cavity, but I do not restrict myself in this application to any particular mechanism nor time for doing the leveling, as it may be accomplished by various means, including the ordinary bottom leveler which is commonly used for bringing the outersole into the proper curvature and shape. As long as the layer or leaf of filler is plastic and has been died or shaped to approximately the shape of the cavity, it will respond in the proper directions and manner to proper pressure when applied thereto, irrespective of whether the pressing device applies said pressure directly on the filler or on a covering sole, and whether the pressure is applied simultaneously over practically the entire bottom or is applied progressively as by a roll.

While, therefore, my process is capable of being carried out by a wide variety of mechanisms or in fact without any organized machine, I prefer to use the machine shown, by way of illustration, in the accompanying drawings, in which—

Figure 1 is a central vertical sectional view of the upper portion of the machine; Fig. 2 is a fragmentary detail looking at the front end of the rotary die or valve, Fig. 1; Fig. 3 is a plan view of the supporting ledge or shelf; and Figs. 4 and 5 are views in front elevation and top plan of the leveling roll and scraper.

On a pedestal 1 is a filler chamber 2 steam-jacketed at 3 from a source 4 and provided with a door 5 to admit the filler leaves 6 placed on a skeleton shelf 7 from which they may automatically fall, as melted, into the sluggishly plastic mass beneath. The filler mass tends to slide down the inclined wall 8 to the nozzle 9, being aided by a plunger 10 operated by a foot lever 11. The bottom 12 slides longitudinally beneath a rotary delivery device and dieing or shaping means 13 mounted in the outlet or nozzle to rotate on a steam pipe 14 as an axis. This die or filler-shaper 13 is shown as cylindrical and provided with four die-pockets 15 each having the general shape or contour of the shoe-bottom to be filled, and containing a movable dumping bottom 16 whose ends 17, 18 work in guides 19 in the ends of the filler-carrier and dieing device 13. Means for regulating the depth of the pockets 15 is shown as consisting of cams 21 fast on the ends of a sleeve 22 mounted on the pipe 14. The device 13 for shaping the filler in the desired died-out, sheet-like flat portions is rotated by handles 23.

The bottom 12 slides on a track 24 provided with a tapper 25 pivoted at 26, whose depending end 27 is struck by the rear end of the bottom 12 when the latter has been slid rearwardly, so that the forward end of the member 25 taps the end 18 of the lowermost movable bottom and thereby positively dumps or ejects the separated shaped-portion of filler from the bottom pocket or die. The toe of the shoe engages a projection 29 for sliding the bottom back from the die when the shoe is moved into place for receiving the filler, and said bottom is retracted by a tension spring 30 secured at its forward end to a stationary part of the bottom in which the movable bottom 12 slides and secured at its rear end to said movable bottom. Just in front of the die is a leveling tool, shown as a roll 31 mounted to turn on a steam pipe 32. As some grains of filler are liable to be crowded over onto the welt by the hot roll, scraping knives 33 are shown as loosely pivoted at 34 for dragging over the welt as the roll is applying its leveling pressure to the filler in the shoe-cavity.

In use, the pockets fill automatically with the filler, and as the device 13 is rotated, it cuts off an even layer or leaf-like piece of filler, which is thereby given the approximate died-out shape or contour of the shoe-bottom cavity, so that all the operator has to do is simply to shove the shoe forward and then draw it back again. No skill is required and no appreciable time is lost. As he shoves the shoe forward, the bottom 12 is removed from its filler-retaining position so that the shaped piece of filler is permitted to drop into the cavity which is being filled, or if the bottom is moved back far enough to strike the ejector, said shaped piece of filler is positively dumped into the cavity, and then, as the shoe is pulled quickly forward, it is brought forcibly against the roll 31, which presses and packs this sheet of filler down hard into the shoe-bottom so as to be spread instantly and accurately into all the marginal portions of the cavity. This is one way of accomplishing the "leveling."

By my present process the work is greatly facilitated, no skill is required, comparatively stiff filler may be used, the operator is relieved of the necessity of keeping a hot tool in his hand, and, in the preferred manner of carrying out the process, he has both hands free. On the other hand, if the process is carried out without any machine, all that is necessary is to die out the piece of plastic filler, drop it into the shoe-cavity, apply the sole then or later, as may be desired, and subject said plastic filler to a vertical leveling pressure sufficient to coöperate with the plasticity of the filler in pressing the filler downward and at the same time laterally in all directions sufficiently to conform the plastic layer to the varying depths and the other conformation of the bottom cavity. Preferably my process is carried out when the filler is heated and the leveling tool is heated, as thereby the stickiness of the filler is rendered active and more permeating and also the filler layer is made more yielding or moldable and adhesive, but the process may be carried out cold, only not so advantageously.

Having described my invention, what I claim as new and desire to secure by Letters Patent is:

1. The herein described process, consisting of dieing-out or shaping a layer of filler approximately to the shape of the shoe-bottom cavity to be filled, applying said died-out piece to said cavity in a plastic condition, and then applying to the filler layer a leveling pressure.

2. The herein described process, consisting of providing filler in a plastic condition, removing therefrom a leaf-like portion having approximately the shape of the cavity to be filled, applying said removed portion of plastic filler to the cavity of the shoe-bottom, and subsequently applying vertical pressure to the plastic filler in the shoe-bottom sufficient to conform the plastic layer of filler to the desired bottom level.

3. The herein described process, consisting of providing filler in a plastic condition, removing therefrom a leaf-like portion having approximately the shape of the cavity to be filled, applying said removed portion of plastic filler to the cavity of the shoe-bottom, and immediately applying vertical pressure in the presence of heat to the plastic filler in the shoe-bottom sufficient to conform the plastic layer of filler to the desired bottom level.

4. The herein described process, consisting of providing filler in a plastic condition, removing therefrom a leaf-like portion having approximately the shape of the cavity to be filled, maintaining the same in the presence of heat, applying said removed heated portion of plastic filler to the cavity of the shoe-bottom, and subsequently applying vertical pressure to the plastic filler in the shoe-bottom sufficient to conform the plastic layer of filler to the desired bottom level.

In testimony whereof, I have signed my name to this specification, in the presence of two subscribing witnesses.

ANDREW THOMA.

Witnesses:
   Geo. H. Maxwell,
   Wallace A. Shipton.